3,511,856
3-(ALKOXYPHENYLCARBAMOYL)-
4-HYDROXYCOUMARINS
John S. McIntyre, Sarnia, Ontario, and Allan R. Knight, Petrolia, Ontario, Canada, assignors to The Dow Chemical Company, Midland, Mich., a corporation of Delaware
No Drawing. Filed June 24, 1968, Ser. No. 739,192
Int. Cl. C07d 7/28; A01n 9/28
U.S. Cl. 260—343.2                5 Claims

ABSTRACT OF THE DISCLOSURE

This disclosure relates to 3-(alkoxyphenylcarbamoyl)-4-hydroxycoumarins, their method of preparation as well as their use as bactericides and pesticides.

Summary of the invention

The present invention relates to a novel and useful group of substituted 3-(phenylcarbamoyl)-4-hydroxycoumarins. It is more particularly concerned with a new series of 3-(alkoxyphenylcarbamoyl) - 4 - hydroxycoumarins. This series of compounds can be represented by the formula:

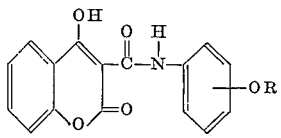

In this and succeeding formulas, R represents lower alkyl.

In the present specification and claims, the term "lower alkyl" is employed to refer to radicals containing from 1 to 4 carbon atoms, inclusive, such as methyl, ethyl, n-propyl, isopropyl, n-butyl, secondary butyl and tertiary butyl.

The compounds of the present invention are crystalline solids and are very useful as pesticides for the control of a wide variety of pests such as the bacterial organisms *Staphylococcus aureus* and *Bacillus subtilis*, and pests such as daphnia and Southern armyworm.

Representative 3-(alkoxyphenylcarbamoyl)-4-hydroxycoumarins of this invention include:

3-(2-methoxyphenylcarbamoyl)-4-hydroxycoumarin,
3-(3-methoxyphenylcarbamoyl)-4-hydroxycoumarin,
3-(4-methoxyphenylcarbamoyl)-4-hydroxycoumarin,
3-(2-ethoxyphenylcarbamoyl)-4-hydroxycoumarin,
3-(3-ethoxyphenylcarbamoyl)-4-hydroxycoumarin,
3-(4-ethoxyphenylcarbamoyl)-4-hydroxycoumarin,
3-(2-propoxyphenylcarbamoyl)-4-hydroxycoumarin,
3-(3-isopropoxyphenylcarbamoyl)-4-hydroxycoumarin,
3-(4-propoxyphenylcarbamoyl)-4-hydroxycoumarin,
3-(2-secondarybutoxyphenylcarbamoyl)-4-hydroxycoumarin,
3-(3-butoxyphenylcarbamoyl)-4-hydroxycoumarin, and
3-(4-tertiarybutoxyphenylcarbamoyl)-4-hydroxycoumarin.

The 3-(alkoxyphenylcarbamoyl)-4-hydroxycoumarins of the invention are prepared by the condensation of 4-hydroxycoumarin with the corresponding substituted phenyl isocyanate in a solvent such as nitrobenzene containing small amounts of triethylamine. The amount of the reactants to be employed is not critical, some of the product being formed when employing any proportions. The reaction consumes the reactants, however, in the ratio of one mole of the 4-hydroxycoumarin per mole of the substituted phenylisocyanate and the employment of such proportions is preferred.

In carrying out this reaction, the reactants and solvent are contacted and maintained together in any convenient fashion. The reaction mixture is heated and the reaction is allowed to proceed at a temperature maintained about 140° C. at atmospheric pressure, with stirring, for a period of one hour. The reaction mixture is cooled and diluted with methanol. This mixture is then filtered to recover the solid product which is then recrystallized from dimethylformamide.

Description of some preferred embodiments

The following examples illustrate the present invention and the manner by which it can be practiced but, as such, should not be construed as limitation upon the overall scope of the same.

EXAMPLE 1

3-(2-methoxyphenylcarbamoyl)-4-hydroxycoumarin 25 grams (0.17 mole) of 2-methoxyphenylisocyanate and 27.5 grams (0.17 mole) of 4-hydroxycoumarin were added to 50 milliliters of nitrobenzene containing 1 milliliter of triethylamine in a boiling flask. The resulting mixture was heated, with stirring at atmospheric pressure to a temperature of 140° C. and maintained at this temperature for one hour. The reaction mixture was cooled and diluted with methanol. This diluted mixture was then filtered to recover the 3-(2-methoxyphenylcarbamoyl)-4-hydroxycoumarin product. This product was then recrystallized from dimethylformamide. The product, a yellow crystalline solid, was obtained in a yield of 91 percent and had a melting point of 180°–181.5° C., a molecular weight of 311 and was found by analysis to have carbon, hydrogen and nitrogen contents of 65.30, 4.22 and 4.63 percent, respectively, as compared with the theoretical contents of 65.59, 4.18 and 4.50 percent, respectively, calculated for the named structure.

EXAMPLE 2

3-(4-methoxyphenylcarbamoyl)-4-hydroxycoumarin 25 grams (0.17 mole) of p-methoxyphenylisocyanate and 27.5 grams (0.17 mole) of 4-hydroxycoumarin were added to 50 milliliters of nitrobenzene containing 1 milliliter of triethylamine in a boiling flask. The reaction mixture was heated, with stirring at atmospheric pressure to a temperature of 140° C. and maintained at this temperature for one hour. The reaction mixture was cooled and diluted with methanol. This diluted mixture was then filtered to remove the 3-(4-methoxyphenylcarbamoyl)-4-hydroxycoumarin product. This product was then recrystallized from dimethylformamide.

The product was obtained in a yield of 45 percent, was a yellow crystalline solid, had a melting point of 193°–194.5° C. and a molecular weight of 311. The product was found by analysis to have carbon, hydrogen and nitrogen contents of 65.20, 4.21 and 4.37 percent, respectively, as compared with the theoretical contents of 65.59, 4.18 and 4.50 percent, respectively, calculated for the named structure.

EXAMPLE 3

3-(2-ethoxyphenylcarbamoyl)-4-hydroxycoumarin 25 grams (0.15 mole) of 2-ethoxyphenylisocyanate and 24.8 grams (0.15 mole) of 4-hydoxycoumarin were added to 50 milliliters of nitrobenzene containing 1 milliliter of triethylamine in a boiling flask. The mixture was heated, with stirring, at atmospheric pressure to a temperature of 140° C. and maintained at this temperature for one hour. The reaction mixture was cooled and diluted with methanol. This diluted mixture was then filtered to recover the solid 3-(2-ethoxyphenylcarbamyl)-4 - hydroxycoumarin product. This product was then recrystallized from dimethylformamide. The product, in the form of yellow needles, was obtained in a yield of 88 percent, had a melting point of 169°–170.5° C. and a molecular weight of 325 and was found by analysis to have a carbon, hydrogen and nitrogen content of 66.35, 4.76 and 4.34 percent, respectively, as compared with the theoretical content of 66.46, 4.62 and 4.31 percent, respectively, calculated for the named structure.

EXAMPLE 4

3-(4-ethoxyphenylcarbamoyl)-4-hydroxycoumarin 100 grams (0.61 mole) of 4-ethoxyphenylisocyanate, 99.2 grams (0.61 mole) of 4-hydroxycoumarin and 200 milliliters of nitrobenzene containing 1.0 milliliter of triethylamine were placed in a boiling flask and heated at atmospheric pressure to a temperature of 140° C. and maintained under these conditions, with stirring, for one hour. The reaction mixture was cooled and diluted with methanol. This diluted mixture was filtered to recover the solid 3-(4-ethoxyphenylcarbamoyl)-4 - hydroxycoumarin product which is then recrystallized from dimethylformamide. The product, a yellow crystalline solid, was obtained in a yield of 92 percent (181 grams), had a molecular weight of 325 and a melting point of 202°–203.5° C. and was found by analysis to have a carbon, hydrogen and nitrogen content of 66.60, 4.68 and 4.31 percent, respectively, as compared with the theoretical content of 66.46, 4.62 and 4.31 percent, respectively, calculated for the named structure.

In a similar manner, other compounds of the invention are prepared as follows:

3-(2-propoxyphenylcarbamoyl) - 4 - hydroxycoumarin, having a molecular weight of 339, by the condensation of 4-hydroxycoumarin with 2-n-propoxyphenylisocyanate in nitrobenzene and triethylamine.

3-(3-isopropoxyphenylcarbamoyl)-4-hydroxycoumarin, having a molecular weight of 339, by the condensation of 4-hydroxycoumarin with 3-isopropoxyphenylisocyanate in nitrobenzene and triethylamine.

3-(4-propoxyphenylcarbamoyl) - 4 - hydroxycourmarin, having a molecular weight of 339, by the condensation of 4-hydroxycoumarin with p-propoxyphenylisocyanate in nitrobenzene and triethylamine.

3-(2-secondary butoxyphenylcarbamoyl)-4 - hydroxycoumarin having a molecular weight of 353 by the condensation of 4-hydroxycoumarin with 2-secondary butylphenylisocyanate in nitrobenzene and triethylamine.

3-(3-butoxyphenylcarbamoyl)-4-hydroxycoumarin having a molecular weight of 353 by the condensation of 4-hydroxycoumarin with 3-n - butoxyphenylsiocyanate in nitrobenzene and triethylamine.

3-(4-tertiary butoxyphenylcarbamoyl) - 4 - hydroxycoumarin having a molecular weight of 353 by the condensation of 4-hydroxycoumarin with p-tertiary butoxyphenylisocyanate in nitrobenzene and triethylamine.

The compounds of the invention are employed as toxicants in pesticides for the control of bacteria, insects and other pests. For such uses, the compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing pesticidal concentrations and usually from about 1 to 10,000 parts by weight of one or more of the compounds per million parts of such composition.

In a representative operation, the compounds of the present invention were tested for their activity for the control of bacterial organisms. Separate suspensions containing one of the compounds were prepared by adding the compound to isopropanol and then diluting each individual mixture to a concentration of about 500 parts by weight of active compound per million parts of warm melted nutrient agar. The resultant treated nutrient was poured into petri dishes and allowed to solidify. A compound of the invention was the sole toxicant in any one treated nutrient. Check dishes were also prepared from the nutrient agar containing none of the toxicant. Droplets of representative organism cultures were applied to the agar surface in each petri dish. The inoculated nutrient agar cultures were then incubated for about 48 hours under conditions conducive to growth of the test organisms. In such operation, 3-(2-methoxyphenylcarbamoyl) - 4 - hydroxycourmarin and 3-(4-ethoxyphenylcarbamoyl)-4-hydroxycoumarin were found to give 100% kill and control over the organism *Bacillus subtilis*. In another representative operation, 3-(4-methoxyphenylcarbamoyl)-4-hydoxycoumarin was found to give 100% kill and control of the organisms *Bacillus subtilis* and *Staphylococcus aureus*. In each of the above determinations, the check nutrient agar supported a heavy growth of the test organisms.

In another representative operation, 3-(4-ethoxyphenylcarbamoyl) - 4 - hydroxycoumarin was employed for the control of Southern armyworm larvae. In this operation, the compound was dispersed in a quantity of water to prepare an aqueous dispersion containing 500 parts of the compound, as sole active toxicant, per million parts by weight of ultimate dispersion. A stand of young cranberry bean plants was thoroughly wetted briefly with the dispersion and the wetted plants permitted to dry. After the plants were dry, 5 live Southern armyworm larvae were placed on each plant of the stand. In identical operations, 5 live Southern armyworm larvae were placed on each plant in a check stand of untreated young cranberry bean plants. Each of the stands was maintained for a period of about 6 days under conditions favorable to the growth of the larvae. At the end of the 6-day period, all of the plants were examined; in the treated stand, there was found a 100 percent kill and control of Southern armyworms, while a thriving population of live Southern armyworm larvae continued to feed on the plants of the check stand.

In another representative operation, 3-(4-ethoxyphenylcarbamoyl) - 4 - hydroxycoumarin was found to give 100 percent kill and control of small fish of the carp family when employed in compositions containing the compound, as the sole toxicant therein, at concentrations as low as 2 parts per million by weight of the ultimate composition.

In additional operations, the compounds 3-(2-methoxyphenylcarbamoyl) - 4 - hydroxycoumarin, 3-(4-methoxyphenylcarbamoyl) - 4 - hydroxycoumarin and 3 - (2-ethoxyphenylcarbamoyl) - 4 - hydroxycoumarin were found to give 100 percent kill and control of the pest daphnia when these test compounds were employed in compositions containing one of the compounds as the sole toxicant therein, at a concentration of as little as 0.1 part per million by weight of the ultimate composition.

Preparation of starting materials

The 4-hydroxycoumarin may be prepared by the reaction of acetylsalicylic acid methyl ester with metallic sodium at temperatures within the range of 165°–175° C. This preparation is further described by Pauly & Lockemann, Berichte, vol. 48, p. 28 (1915) and in U.S. Pat. 2,465,293.

The substituted phenyl isocyanates may be prepared by the reaction of the appropriate alkoxy substituted aniline with phosgene in benzene. The steps in this preparation procedure include adding the substituted aniline to benzene and then adding to this mixture, a 20 percent solution of phosgene in benzene. After a short induction period, a 50 percent solution of phosgene in benzene is added and this mixture is then refluxed until the precipitate which forms, disappears. The product is then recovered by distillation in vacuum. The substituted aniline may be prepared by any conventional procedure such as the hydrogenation of the appropriate alkoxy substituted nitrobenzene in the presence of Raney nickel. The preparation of the isocyanate starting materials is further described by Aleš Sekera et al. in Chemical Abstracts, volume 47, page 12302g.

What is claimed is:
1. The compound corresponding to the formula

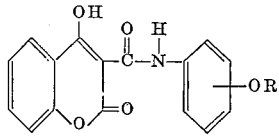

wherein R represents lower alkyl.

2. The compound of claim 1 wherein the compound is 3-(2-methoxyphenylcarbamoyl)-4-hydroxycoumarin.
3. The compound of claim 1 wherein the compound is 3-(4-methoxyphenylcarbamoyl)-4-hydroxycoumarin.
4. The compound of claim 1 wherein the compound is 3-(2-ethoxyphenylcarbamoyl)-4-hydroxycoumarin.
5. The compound of claim 1 wherein the compound is 3-(4-ethoxyphenylcarbamoyl)-4-hydroxycoumarin.

References Cited
UNITED STATES PATENTS
3,122,557  2/1964  Molho _____ 260—343.2 XR
3,293,255  12/1966  Molho et al. __ 260—343.2 XR NORMA S. MILESTONE, Primary Examiner
J. M. FORD, Assistant Examiner U.S. Cl. X.R.
424—281